Sept. 21, 1965    J. R. R. HARTER    3,207,034
STREAMLINED FIBER FASCICULUS SUBMARINE PERISCOPE
Filed Oct. 29, 1962    3 Sheets-Sheet 1

INVENTOR.
JAMES R. R. HARTER
BY
Vincent L. Carney
ATTORNEY

Sept. 21, 1965   J. R. R. HARTER   3,207,034
STREAMLINED FIBER FASCICULUS SUBMARINE PERISCOPE
Filed Oct. 29, 1962   3 Sheets-Sheet 2

INVENTOR.
JAMES R. R. HARTER
BY
Vincent L. Carney
ATTORNEY

Sept. 21, 1965  J. R. R. HARTER  3,207,034
STREAMLINED FIBER FASCICULUS SUBMARINE PERISCOPE
Filed Oct. 29, 1962  3 Sheets-Sheet 3

INVENTOR.
JAMES R. R. HARTER
BY
Vincent L. Carney
ATTORNEY

United States Patent Office 3,207,034
Patented Sept. 21, 1965

3,207,034
STREAMLINED FIBER FASCICULUS
SUBMARINE PERISCOPE
James R. R. Harter, Washington, D.C., assignor to the United States of America as represented by the Secretary of the Navy
Filed Oct. 29, 1962, Ser. No. 233,978
1 Claim. (Cl. 88—72)
(Granted under Title 35, U.S. Code (1952), sec. 266)

The invention described herein may be manufactured and used by or for the Government of the United States of America for governmental purposes without the payment of any royalties thereon or therefor.

This invention relates to periscopes and more particularly relates to submarine periscopes which have low drag characteristics in water and which do not create large surface disturbances.

The conventional optical system of a submarine periscope necessitates that the cross-sectional area of the portion of the periscope that transmits the image from the periscope head to its eye-piece lens or to a TV camera be large and of the proper shape to accommodate an entire image from the head of the periscope. The periscope is usually cylindrical.

The size and shape of periscopes, having such conventional optical systems, cause an unsatisfactory amount of disturbance on the surface of the water when the submarines are moving underwater with only a portion of their periscopes above the surface of the water. This disturbance increases the chances of detection of the submarine. Also, the size and the shape of such periscopes cause excessive stress on the submarine due to drag on the periscope by the water through which it is moved. Accordingly it is an object of this invention to provide a periscope that has low drag characteristics.

It is another object of this invention to provide a periscope that does not cause large disturbances on the surface of the water when the submarine is moving underwater with only a portion of its periscope above the water.

It is another object of this invention to provide an optical system for submarine periscopes that permits the periscope to have a more desirable hydrodynamic shape having a small frontal cross-sectional area.

It is a still further object of this invention to provide an optical system for submarine periscopes that permits an image which is formed in the head of the periscope to be changed in shape, transmitted down the periscope in its new shape and then restored again to its original shape.

Other objects and many of the attendant advantages of this invention will be readily appreciated as the same becomes better understood by reference to the following detailed description when considered in connection with the accompanying drawings wherein.

Figure 1:
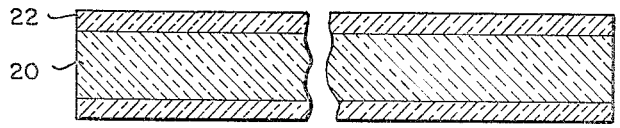
FIG. 1 is a cross-sectional view of segment of light conducting fiber taken along the longitudinal axis of the fiber.
Figure 2:
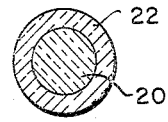
FIG. 2 is a cross-sectional view of a segment of light conducting fiber taken in a direction normal to the longitudinal axis of the fiber.

Referring to FIG. 1, a cross-sectional view of a segment of a light transmitting or light conducting fiber taken along the longitudinal axis of the fiber is shown, having an elongated core 20 in the shape of a solid cylinder with a thin coating 22 which forms an outer cylindrical surface covering the core 20. A cross-sectional view of the fiber taken normal to its longitudinal axis is shown in FIG. 2. The inner core 20 is a transparent material such as glass or plastic, but glass is preferred since better images may be obtained with it than with presently available plastics. The outer coating 22 is also a transparent material such as glass, resin or clear instrument lacquer, but has a lower index of refraction than the material used for the inner core of the fiber.

The outer diameter of the entire fiber including both the core 20 and the coating 22 may be in the range of 5 to 15 microns but diameters as small as 3 microns are possible if desired. The inner core may be heavy flint glass with an index of refraction of approximately 1.7, and the outer coating may be zinc crown glass with an index of refraction of approximately 1.5. Larger glass fibers may be used and the glass fibers may be constructed of different materials but the construction above provides efficient operation in the invention.

Fibers which are constructed in the manner described above are capable of transmitting light along their length even though the fiber may bend and twist. The light rays are refracted by the coating 22 so that they do not leave the light conducting fiber but travel along its length and appear at the opposite end of the fiber from that at which they started.

Figure 3:
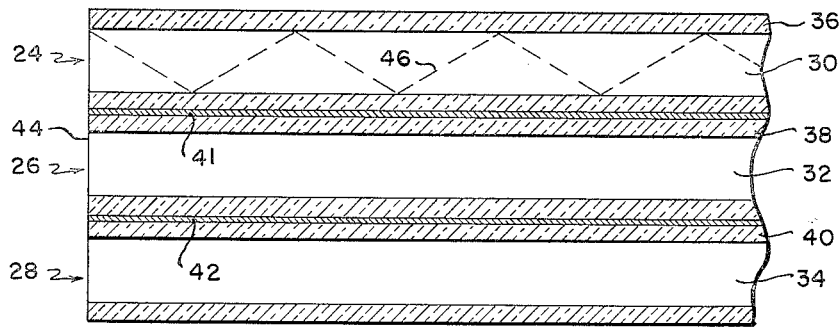
FIG. 3 is a cross-sectional view of a bundle of light conducting fibers showing three fibers along their longitudinal axes with the path of light through one fiber indicated by dotted lines.

A cross-sectional view of a segment of three light conducting fibers 24, 26, and 28, taken along the longitudinal axes of the three fibers, is shown in FIG. 3. The three fibers 24, 26, and 28 which are shown in FIG. 3 have glass cores 30, 32, and 34 respectively and glass coatings 36, 38 and 40 respectively. The fibers are held together with a binding material 41 and 42 such as an adhesive or cement applied on the surface of each fiber so as to form a layer between them.

One end 44 of the bundle of fibers shown in FIG. 3 is optically ground. Light enters each of the fibers from this end and is transmitted down their length so that an image formed on the face 44 is conducted piecemeal from the surface 44 to the other end of the fibers. The path of a ray of light is shown schematically by the dotted line 46. The light is prevented from leaving the transparent fiber by the outer coating which refracts the light which impinges upon it back into the core.

Figure 4:
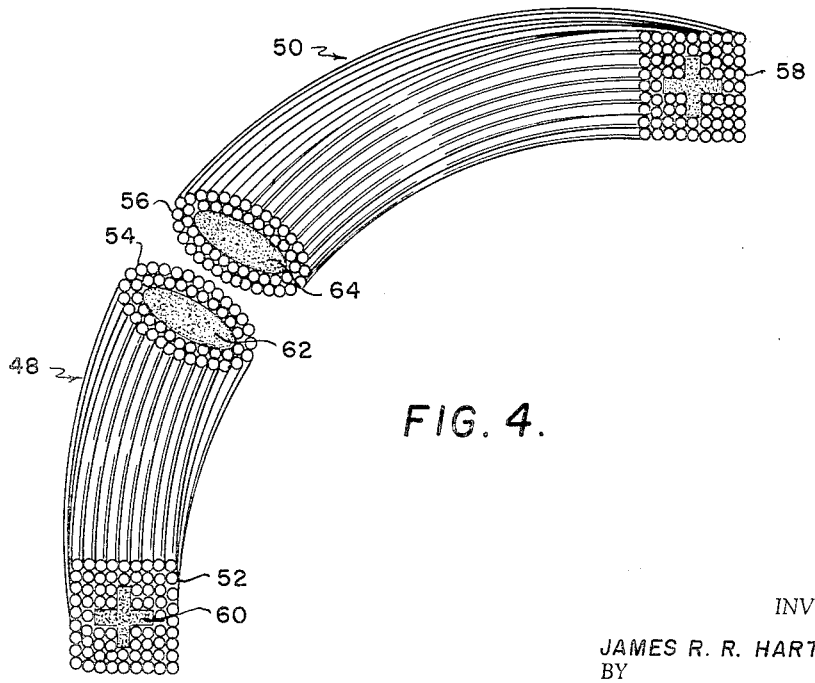
FIG. 4 is a perspective view of two bundles of light conducting fibers.

Two bundles 48 and 50 of light conducting fibers are shown in perspective in FIG. 4. Bundle 48 has one end 52 which has an optically ground surface and in which the fibers are arranged so as to form a square with their ends. The arrangement of the individual fibers with respect to each other is changed at different points along the longitudinal axis of the bundle so that they form an elliptical surface at end 54, which surface is also optically ground.

Opposite to the end 54 of the light conducting bundle 48 and spaced a short distance from it, is one end 56 of light conducting bundle 50. This end of bundle 50 is optically ground and the individual fibers are arranged so as to form an elliptical surface with their ends. The elliptical surface of the end 56 of light conducting bundle 50 matches the elliptical surface of the end 54 of the light conducting bundle 48 so that a light ray leaving end 54 of bundle 48 at a direction normal to the surface formed by the ends of the fibers will impinge upon end 56 of bundle 50 in a normal direction and at a point on end 56 corresponding geometrically to the point it left on end 54. The arrangement of the individual fibers of bundle 50 is changed at different points along the longitudinal axis of the bundle so that they form a square surface with their ends at the other end 58 of bundle 50, which end is also optically ground.

As an example, an image 60 in the form of a cross is shown on the square surface 52 of the light conducting bundle 48. This image appears in the form of an oblong shape 62 on the elliptical surface 54 at the other end of the light conducting bundle 48 since the individual fibers have been rearranged at this end. The light conducting bundle 50 reforms this oblong image back into a square. The oblong image 64 is projected from the elliptical surface 54 of the light conducting bundle 48 to the elliptical surface 56 of the light conducting bundle 50. The individual light conducting fibers of bundle 50 are arranged with respect to each other so as to form a square at the other end of bundle 50 in which the ends of the light conducting fibers bear the same relation to one another with respect to the ends of the fibers on the elliptical surface 56, as the ends of the light conducting fibers in the square surface 52 bear to the ends of the fibers in the elliptical surface 54. This causes the cross 60 to be reformed on the surface 58.

A bundle of light conducting fibers of the type shown in FIG. 4 forms the light conducting medium in the periscope of this invention. The light from the head of the periscope is received by one surface formed by the ends of the individual light conducting fibers and received at another surface formed by the other ends of the light conducting fibers arranged in the same order as the first surface. The bundle of light conducting fibers between these two surfaces is shaped to fit a streamlined periscope skin which will offer little resistance to water flow around it.

Figure 5:
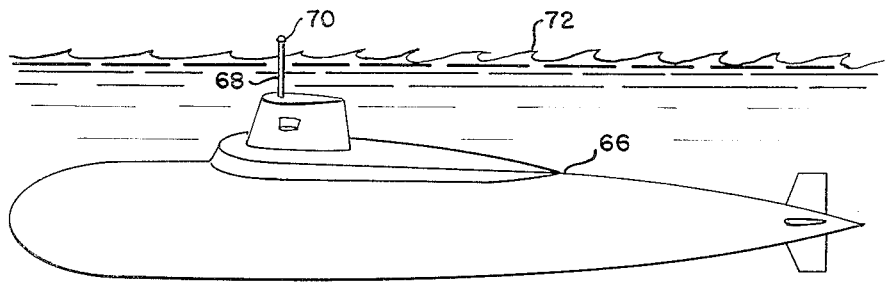
FIG. 5 is a simplified perspective view of a submarine.

Referring to FIG. 5, a submarine 66 is shown having a periscope 68. When the submarine is travelling near the surface with the head 70 of the periscope 68 above the water for observation of the locality, the periscope disturbs the water at the surface 72 making the submarine easier to detect. Also the force required to move the water stresses the periscope and the submarine at the junctions between the periscope and the body of the submarine.

Figure 6:
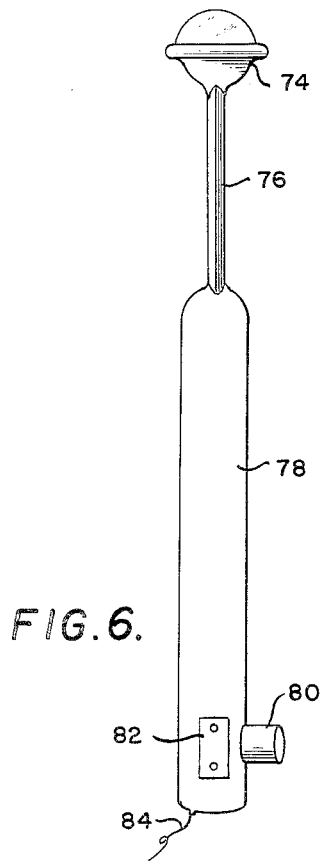
FIG. 6 is a perspective view of a periscope suitable for use on a submarine.

The periscope shown in FIG. 6 has a head 74 for receiving an image above the surface of the water, a fairwater section 76 which normally is partially above the water and partially below the water when the periscope is in use, and an inboard end of the periscope 78 which is partially inside of the submarine and partially outside of the submarine. An eyepiece 80, an azimuth and elevation control panel 82 and an electrical connection 84 to a power source for the drivemotor are mounted in the inboard section of the periscope.

Figure 7:
FIG. 7 is a cross-section view of a conventional periscope taken in a direction perpendicular to the longitudinal axis of the periscope.

A periscope with a conventional optical system usually has a fairwater section with a cylindrical cross-section such as that shown in FIG. 7. The cylindrical housing 86 is made of a strong, water-tight material such as metal or laminated plasticized fabric. It protects an opening through which an image formed at the head of the periscope is projected to the eyepiece of the periscope.

Figure 8:
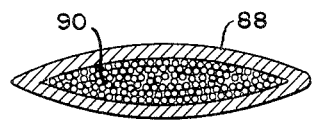
FIG. 8 is a cross-sectional view in a direction perpendicular to the longitudinal axis of a periscope of the type used in one embodiment of this invention.

A periscope which uses glass fibers as a transmitting element in its optical system may have a more streamlined shape such as that shown in FIG. 8. The housing 88 may take this more streamlined shape since the glass fibers which are enclosed within the housing may be moved with respect to one another to assume the streamline shape in the fairwater section without distorting the image which is received in the eye piece as long as the ends of the glass fibers have the same relative placement with respect to each other at both the head and the eyepiece of the periscope.

The best shape of the fairwater section of the periscope for various size submarines can be determined by hydraulic experiments such as by testing the amount of drag on models towed through a basin of water or can be calculated by standard formulas. The streamlined shape of optimum fineness ratio has a much reduced projected area in the direction of motion through the water and thus can minimize drag and water disturbance. Also the optical aperture of the periscope can be increased beyond that now in use with the largest permissible diameter of the fairwater section of a periscope.

Figure 9:
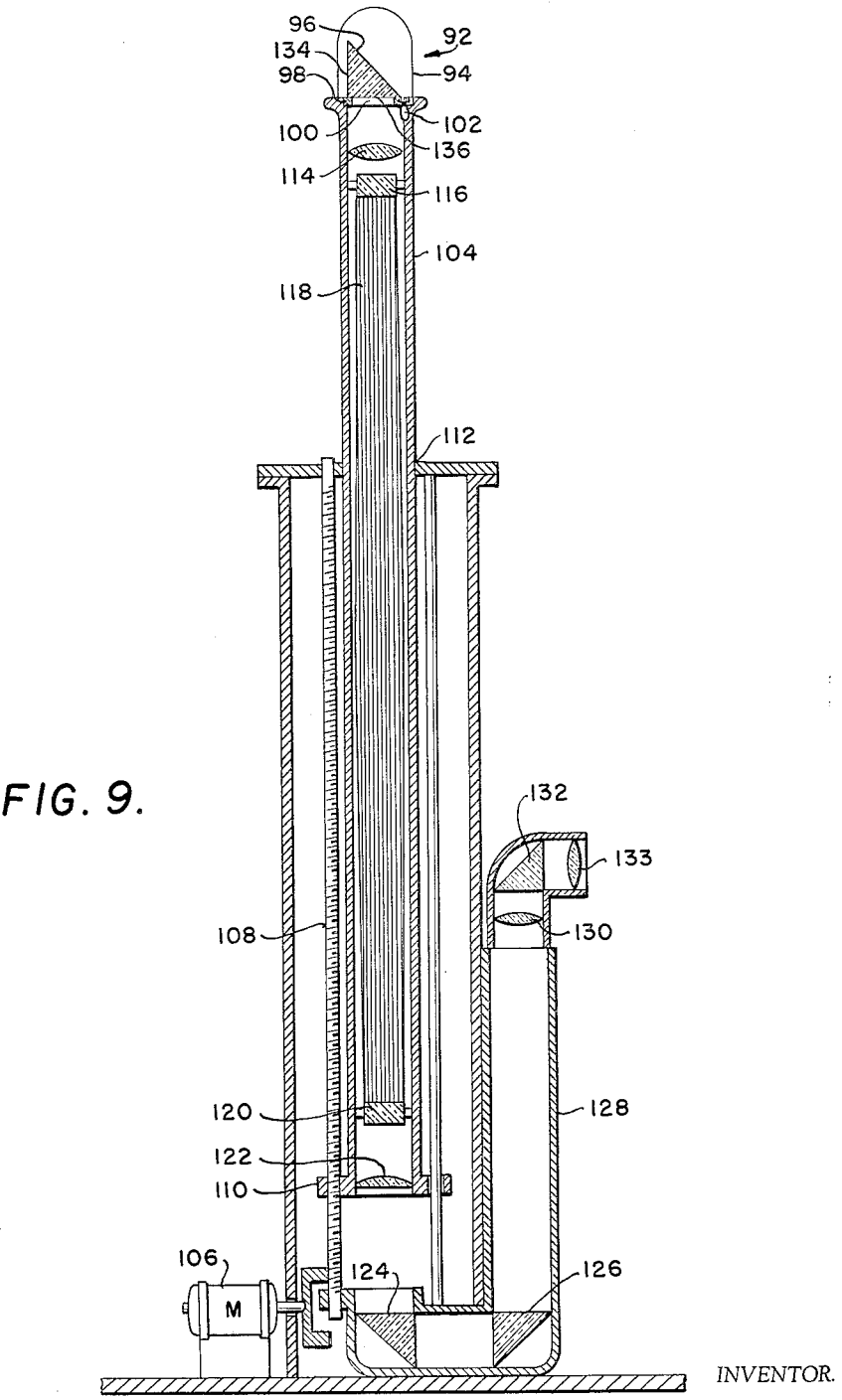
FIG. 9 is a cross-sectional view in a direction parallel to the longitudinal axis of a periscope of the type used in one embodiment of the invention.

A cross-sectional view of a submarine periscope illustrating one embodiment of the invention is shown in FIG. 9.

The head of the periscope has a hemispherical optical window 94 with a concentric grind. Inside this optical window is a right angle prism 96 mounted on a rotatable table 98 so as to have one face in a vertical plane and a second face in a horizontal plane positioned over the aperture 100 in the rotatable table. Electric motor 102 is used to rotate the table 98, said table having a ring gear surrounding an opening in its horizontal surface.

The hemispherical window 94 is fitted to metal periscope housing 104 and sealed so as to be water tight. The housing 104 has a streamlined shape similar to that shown in the cross-sectional view of FIG. 8. An electric motor 106 drives screw 108 to move the housing 104 up or down with the movable support 110. A movable water tight seal is formed at the junction 112 of the outer surface of the submarine and the periscope.

An objective lens 114 is mounted in the housing 104 near the periscope head 92 under the aperture 100 in the rotating table 98. This lens focuses the image from the right angle prism 96 in the plane 116 of the glass fiber ends 118 which are assembled in a cylindrical bundle at this point and which have their ends ground so as to be optically flat. The fibers are rearranged just below this point so as to conform to the streamlined shape of the periscope housing.

At the lower end of the periscope the fibers are rearranged so that the ends have the same placement at end 120 as they had at end 116. This end is also optically flat and forms the same image as was projected upon end 116. Objective lens 122 which is below the fiber ends 120 focuses this image upon the right angle prism 124 which in turn focuses the image upon the right angle prism 126 which is placed at a location horizontal to that of prism 124. One vertical face of right angle prism 126 is parallel to one of the faces of prism 124. A second face of the prism 126 is horizontal and forms an image which is focused by objective lens 130 which is located above prism 126 and inside of the inboard housing 128. This lens is rotated to provide for image erection.

The two prisms 124 and 126 could of course be replaced by a television transmitter to receive the image from the prism 92 and to transmit this image to a conveniently located receiver.

However, in this illustrative embodiment the image is focused by lens 130 on to eyepiece prism 132. This right angle prism has one horizontal face located above the lens 130 and one vertical face. Eyepiece lens 134 focuses the image for the observer.

The periscope is erected by motor 106 which drives screw 108 so as to raise the housing 104 until the head 92 of the periscope is above the surface of the water. The prism 96 is positioned so as to receive light from the desired direction by rotatable table 98 which is moved by the small electric motor 102.

The image formed by the prism 96 on the vertical face 134 is formed on the horizontal face 136. This image passes through the aperture 100 in the rotatable table 98 to lens 114 which focuses it upon the end 116 of the bundle of light conducting fibers 118. These fibers conduct the light to end 120 where the image is again formed. This image is focused by lens 122 on to a television camera or on to the prism system which includes prisms 124 and 126 and lens 130. This system serves to position the image for the observer. An eyepiece has a right angle prism 132 and a lens 133 to focus the image for the benefit of the observer.

Obviously many modifications and variations of the present invention are possible in the light of the above teachings. It is therefore to be understood that within the scope of the appended claim the invention may be practiced otherwise than as specifically described.

What is claimed is:

A periscope comprising:
- a first body member;
- a second body member telescopically mounted within said first body member and extendable therefrom;
- means for telescopically extending said second body member;
- said second body member having a scanning portion, a midportion streamlined in transverse cross section and a terminal portion;
- a hemispherical optical window having concentrically ground hemispherical surfaces mounted on the end of the scanning portion of said second body member which projects outside said first body member;
- a ring gear mounted on the end of said second body member in the plane of the edges of the hemispherical window;
- means mounted within said second body member and in engagement with said ring gear for rotating said ring gear;
- a right angled prism mounted on the ring gear to span the opening in the ring;
- a bundle of optical fibers in the second body extending from said scanning portion through said streamlined midportion to said terminal portion;
- said bundle having each of its ends ground as optical flats and its midportion conforming in transverse cross sectional shape to that of the streamline midportion of said second body member;
- optical means mounted to focus the image transmitted by said prism onto the optically flat surface at the end of the optical fiber in the scanning portion;
- an optical viewing system mounted to receive the image transmitted by said optical fibers;
- said viewing system being mounted in said first body member; and
- optical means mounted in the terminal portion of said second body member to project the image transmitted by the optical fibers on to said viewing system.

References Cited by the Examiner

UNITED STATES PATENTS

| | | | |
|---|---|---|---|
| 2,534,884 | 12/50 | Strang | 88—69 |
| 3,014,133 | 12/61 | Speller et al. | 88—68 X |
| 3,020,806 | 2/62 | Castrucci | 88—70 |
| 3,027,477 | 3/62 | Sheldon | 88—1 X |
| 3,136,208 | 6/64 | Magson | 88—57 X |

JEWELL H. PEDERSEN, *Primary Examiner.*